US012542672B2

(12) United States Patent
Pindado Tost et al.

(10) Patent No.: US 12,542,672 B2
(45) Date of Patent: Feb. 3, 2026

(54) SYSTEM AND METHOD FOR PROVIDING ZERO-KNOWLEDGE RANGE PROOFS

(71) Applicant: QPQ Ltd., Dublin (IE)

(72) Inventors: Zaira Pindado Tost, Barcelona (ES); Emanuele Ragnoli, Dublin (IE); Roberto Ripamonti, Guanzate (IT)

(73) Assignee: QPQ Ltd., Dublin (IE)

( * ) Notice: Subject to any disclaimer, the term of this patent is extended or adjusted under 35 U.S.C. 154(b) by 774 days.

(21) Appl. No.: 17/867,304

(22) Filed: Jul. 18, 2022

(65) Prior Publication Data

US 2024/0022416 A1    Jan. 18, 2024

(51) Int. Cl.
*H04L 29/06*    (2006.01)
*G06F 21/62*    (2013.01)
*H04L 9/32*    (2006.01)

(52) U.S. Cl.
CPC ........ *H04L 9/3218* (2013.01); *G06F 21/6245* (2013.01)

(58) Field of Classification Search
CPC ............................ H04L 9/3218; G06F 21/6245
USPC ........................................................ 713/168
See application file for complete search history.

(56) References Cited

U.S. PATENT DOCUMENTS

| | | | | |
|---|---|---|---|---|
| 9,356,783 | B2* | 5/2016 | Joye | H04L 9/3006 |
| 10,032,046 | B1* | 7/2018 | Hayashi | H04L 63/0245 |
| 11,288,377 | B1* | 3/2022 | Kopylov | G06F 9/45558 |
| 11,526,622 | B1* | 12/2022 | White | H04L 63/12 |
| 2004/0064700 | A1* | 4/2004 | Kim | H04L 9/3218 |
| | | | | 713/170 |
| 2010/0211782 | A1* | 8/2010 | Auradkar | H04L 9/083 |
| | | | | 713/168 |
| 2019/0164153 | A1* | 5/2019 | Agrawal | G06Q 20/065 |
| 2020/0169386 | A1* | 5/2020 | Liu | H04L 9/3263 |
| 2020/0322132 | A1* | 10/2020 | Covaci | G06F 16/2246 |
| 2020/0342452 | A1* | 10/2020 | Diamond | G06Q 20/3674 |
| 2021/0049594 | A1* | 2/2021 | Liu | G06Q 20/4037 |
| 2021/0226803 | A1* | 7/2021 | Traynor | H04L 63/0823 |
| 2021/0336789 | A1* | 10/2021 | Chalkias | H04L 9/3239 |
| 2021/0342894 | A1* | 11/2021 | Pestana | H04L 63/0407 |
| 2022/0377084 | A1* | 11/2022 | Zhang | H04L 63/0272 |
| 2023/0186296 | A1* | 6/2023 | Vines | G06Q 20/389 |
| | | | | 705/71 |

(Continued)

OTHER PUBLICATIONS

Ben-Sasson, "Fast Reed-Solomon Interactive Oracle Proofs of Proximity", 2012, ACM, pp. 1-13 (Year: 2012).*

(Continued)

*Primary Examiner* — Taghi T Arani
*Assistant Examiner* — Gregory A Lane
(74) *Attorney, Agent, or Firm* — Foley & Lardner LLP (57) ABSTRACT

A system and a method for providing zero-knowledge range proofs for verifiable privacy-preserving queries are provided. The method comprises: defining a bilinear group; receiving, by a prover, a query from a verifier; determining a range proof for a result of the query implementing a variation of a bulletproof (BP) range proof system; generating a first inner product for the range proof, implementing the variation of the BP range proof system; generating a second inner product for the range proof, implementing a trusted inner pairing product (TIPP) proof system; and providing, by the prover, elements as the proof to the verifier.

20 Claims, 3 Drawing Sheets

(56) References Cited

U.S. PATENT DOCUMENTS

| | | | | |
|---|---|---|---|---|
| 2024/0104521 | A1* | 3/2024 | Azgad-Tromer | ............................ G06Q 20/4016 |
| 2024/0428241 | A1* | 12/2024 | Vaughan | .............. G06Q 20/389 |

OTHER PUBLICATIONS

Cormode, "Verifying Computations with Streaming Interactive Proofs", Sep. 30, 2011, Proceedings of the VLDB Endowment, pp. 25-36 (Year: 2011).*

Eduardo Morais et al: "A Survey on Zero 1-15 Knowledge Range Proofs and Applications", arxiv.org, Cornell University Library, 201 Olin Library Cornell University Ithaca, NY 14853, Jul. 15, 2019 (Jul. 15, 2019), XP081442007.

Benedikt Bunz et al: "Bulletproofs: Short Proofs for Confidential Transactions and More", IACR, International Association for Cryptologic Research, vol. 20220414:014622 Apr. 13, 2022 (Apr. 13, 2022), pp. 1-46, XP061071020, Retrieved from the Internet: URL:https://eprint.iacr.org/2017/1066.pdf [retrieved on Apr. 13, 2022].

Benedikt Bunz et al: "Proofs for Inner Pairing Products and Applications", IACR, International Association for Cryptologic Research, vol. 20200212:182642 Feb. 12, 2020 (Feb. 12, 2020), pp. 1-47, XP061034981, Retrieved from the Internet: URL:http://eprint.iacr.org/2019/1177.pdf [retrieved on Feb. 12, 2020].

Liam Eagen: "Bulletproofs++", IACR, International Association for Cryptologic Research, vol. 20220502:104928 Apr. 28, 2022 (Apr. 28, 2022), pp. 1-31, XP061071177, Retrieved from the Internet: URL:https://eprint.iacr.org/2022/510.pdf [retrieved on Apr. 28, 2022].

Bünz et al., Bulletproofs: Short Proofs for Confidential Transactions and More, IEEE SP 2018.

Bootle et al., Efficient Zero-Knowledge Arguments for Arithmetic Circuits in the Discrete Log Setting, Eurocrypt 2016.

Bünz et al., Proofs for Inner Pairing Products and Applications, 2019.

Daza et al., Updateable Inner Product Argument with Logarithmic Verifier and Applications, Public Key Conference 2020.

Camenisch et al., Efficent Protocols for Set Membership and Range Proofs, 2008.

Groth, et al., Update and Universal Common Reference Strings with Applications to zk-SNARKs, 2018.

Thompson, et al., Privacy-Preserving Computation and Verification of Aggregate Queries on Outsourced Databases, HP Laboratories, HPL-2009-119, 2009.

* cited by examiner

SYSTEM AND METHOD FOR PROVIDING ZERO-KNOWLEDGE RANGE PROOFS

FIELD OF THE PRESENT DISCLOSURE

The present disclosure generally relates to verifiable computing, and more particularly to a system and method for providing zero-knowledge range proofs for verifiable privacy-preserving queries.

BACKGROUND

Verifiable computing (or verified computation or verified computing) enables a computer to offload the computation of some function, to other perhaps clients, while maintaining verifiable results. The other clients evaluate the function and return the result with a proof that the computation of the function was carried out correctly. Verifiable computing applied to database technologies, where the execution of a data query on a dataset is complete, correct, and done with real time dataset updates without revealing the underlying dataset, is an active area of research without robust products and technologies. In some scenarios, the clients to whom the computational tasks are outsourced may not be trustworthy. In such cases, the systems employing verifiable computing may find it difficult to confirm an accuracy of the outsourced computational tasks. For such scenarios, a proof of the performed computational tasks may be generated by the client and send to the users along with the results of the computational tasks. However, the conventional systems fail to guarantee completeness and accuracy of the computational tasks, without revelation of the underlying dataset, in real-time.

Zero-knowledge proofs have been implemented in the state of art to resolve the issue of guaranteeing the accuracy of the computational tasks. Zero-knowledge proofs are a fundamental family of cryptographic primitives that have been used in multiple applications in the last decades. A zero-knowledge proof is a proof system between two parties, the prover and the verifier, that allows to prove some statement without revealing anything beyond its validity. These proof systems have been used in practise for guaranteeing the correctness of transactions in cryptocurrencies, for verifiable computation to delegate a costly computation and receive the result along with a proof that guarantees the correctness of it, for verifying shuffles, etc.

A range proof is a particular case of zero-knowledge proof that guarantees some secret value is in a given range without revealing it. The prover commits to the secret value and then proves that this value lies in a given interval. Range proofs are used in practise for anonymous credentials, for example to prove that someone's age is between 18 and 65, and confidential transactions, for example for validating that transactions are positive (such as, the sum of the inputs is greater than the sum of the outputs) without revealing the amounts involved.

The range proof presented in "Bulletproofs" paper by Bünz et al. [See: Benedikt Bünz, Jonathan Bootle, Dan Boneh, Andrew Poelstra, Pieter Wuille and Greg Maxwell, Bulletproofs: Short Proofs for Confidential Transactions and More, IEEE SP 2018] caused a great impact in the last few years. Many protocols in blockchains like Monero and Mimblewimble have been using "Bulletproofs" since 2018 to make their transactions confidential. The main ingredient is an inner product argument based on the work of Bootle et al. [See: Jonathan Bootle, Andrea Cerulli, Pyrros Chaidos, Jens Groth and Christophe Petit, Efficient Zero-Knowledge Arguments for Arithmetic Circuits in the Discrete Log Setting, Eurocrypt 2016; incorporated herein in its entirety by reference]. An argument is a proof system in which security is proven against adversaries with computational power. Bulletproofs are very practical because the size of the proof is logarithmic in the witness size and the range proofs can be aggregated.

The present disclosure has been made in view of such considerations, and it is an object of the present disclosure to provide a system and method for providing zero-knowledge range proof using a range proof scheme with logarithmic size and logarithmic verification time that is suitable for verifiable privacy-preserving queries like Maximum, Minimum, Median and k-th item query.

SUMMARY

In an aspect of the present disclosure, a method for providing zero-knowledge range proofs for verifiable privacy-preserving queries is provided. The method comprises defining a bilinear group where a prover and a verifier implement proof systems, containing three prime-order groups $G_1$, $G_2$, $G_T$ and a bilinear map e defined by a pairing operation as: $G_1 \times G_2 \to G_T$, for each pair of elements $x_1$, $x_2$ belonging to $G_1$, $G_2$ respectively. The method further comprises receiving, by the prover, a query from the verifier. The method further comprises determining, by the prover, a range proof for a result of the query, implementing a variation of a bulletproof (BP) range proof system, over a bilinear group using Trusted Inner Pairing Product (TIPP) proof system for inner pairing products. The method further comprises generating, by the prover, a first inner product for the range proof, implementing the variation of the BP range proof system, for proving from the inner product of two scalar vectors l, r of size n, giving a proof for $\hat{t}$ is a scalar inner product defined as:

$$\hat{t} = \sum_{i=1}^{n} l_i r_i \in Z_p.$$

The method further comprises generating, by the prover, a second inner product for the range proof, implementing a trusted inner pairing product (TIPP) proof system, from two vectors A, B of size m that belong to $G_1$, $G_2$ respectively, using the bilinear map e, wherein the second inner product is defined as:

$$Z := e(A, B) = \prod_{i=1}^{n} e(A_i, B_i) \in G_T.$$

The method further comprises combining, by the prover, settings of the implemented variation of the BP range proof system and the implemented TIPP proof system by utilizing G as a first group of the bilinear group as: $G = G_1$. The method further comprises defining, by the prover, two vectors in the groups $G_1$, $G_2$ such that a relationship between the first inner product from the implemented variation of the BP range proof system and the second inner product from the implemented TIPP proof system is proven by embedding the scalar vectors l, r to groups $G_1$, $G_2$ respectively, by exponentiation as:

$$A = (g^{l_1}, \ldots, g^{l_n}) \in G_1^n, B = (h'^{r_1}, \ldots, h'^{r_n}) \in G_2^n.$$

This, by properties of the inner pairing product provides the relation for vectors in the group A, B with respect to the scalar inner product $\hat{t}$ is:

$$Z = \prod_{i=1}^{n} e(A_i, B_i) =$$
$$\prod_{i=1}^{n} e(g^{l_i}, h^{r_i}) = \prod_{i=1}^{n} e(g, h)^{l_i r_i} = e(g, h)^{\sum_{i=1}^{n} l_i r_i} = e(g, h)^{\hat{t}},$$

which implies that m=n. The method further comprises providing, by the prover, elements as proof to the verifier, including the element $\hat{t} \in \mathbb{Z}_p$, $Z \in G_T$ to allow the verifier to check the relation: $Z=e(g, h)^{\hat{t}}$, as g, h are public generators of groups $G_1$, $G_2$ respectively.

In one or more embodiments, the method further comprises defining, by the prover, commitments that are used in the implemented variation of the BP range proof system in the group $G_T$, instead of $G_1$, and the verifier checking the equations in $G_T$ instead of $G_1$ in consequence.

In one or more embodiments, implementing the variation of the BP range proof system involves 2 independent generators in $G_1$, one independent generator in $G_T$, and n generators at each group $G_1$, $G_2$ with a special form (powers of some secret values in the exponent), and wherein the said independent generators in $G_1$ are used for computing Pedersen commitments and the other generators for computing perfectly hiding TIPP commitment and TIPP commitment; for generating a zero-knowledge range proof. Herein, the said independent generators are reusable for providing zero-knowledge range proofs for different queries, while implementing the variation of the BP range proof system.

In one or more embodiments, implementing the TIPP proof system involves 2n generators g, $g^\alpha$, ..., $g^{\alpha^{2n-1}}$, $g^\beta$ in $G_1$ and 2n generators h, $h^\beta$, ..., $h^{\beta^{(2n-1)}}$, $h^\alpha$ in $G_2$, and wherein the said generators are monomials in exponent forming a updatable Structured Reference String (SRS). Herein, the said generators form same SRS for providing zero-knowledge range proofs for different queries, which includes implementing the TIPP proof system.

In one or more embodiments, the pairing operation is bilinear: for all $g^a \in G_1$, $h^b \in G_2$, $e(g^a, h^b) = e(g^{ab}, h) = e(g, h^{ab}) = e(g, h)^{ab}$.

In one or more embodiments, elements of the prime-order groups $G_1$, $G_2$ are points of elliptic curves.

In one or more embodiments, the defined bilinear group is a structured group.

In one or more embodiments, the bilinear map e associates two elements $x_1 \in G_1$, $x_2 \in G_2$ to an element in $G_T$.

In one or more embodiments, the condition for relating the inner product of vectors in different settings is $Z=e(g, h)^{\hat{t}}$.

The SRS is updatable once the size of n is fixed.

In another aspect of the present disclosure, a system is provided. The system comprises a data owner device providing data. The system further comprises a client device providing a query related to the said data. The system further comprises a service provider device comprising a database configured to store the said data from the data owner device. Herein, the service provider device is configured to: receive the query from the client device, compute a zero-knowledge range proof for the received query using the stored data in the database thereof, by executing the method as described above, and provide the computed zero-knowledge range proof to the client device.

In one or more embodiments, the service provider device is the prover, and the client device is the verifier. Herein, the client device is configured to utilize the provided verification key and the elements of the proof which include Z and $\hat{t}$ values and the rest of the elements of the proof for verifying the computed result and the zero-knowledge range proof provided thereto.

In one or more embodiments, the service provider device further comprises a key-value datastore configured to store previously executed queries along with corresponding zero-knowledge range proofs.

In one or more embodiments, the service provider device is further configured to store the received query along with the computed result and zero-knowledge range proof therefor in the key-value datastore.

In one or more embodiments, the data owner device is configured to update the said data. Herein, the service provider device is further configured to: determine one or more previously executed queries along with corresponding one or more zero-knowledge range proofs stored in the key-value datastore related to the updated data; and delete the determined one or more previously executed queries along with the corresponding one or more zero-knowledge range proofs from the key-value datastore, in case of updation of the said data.

In yet another aspect, a non-transitory computer-readable medium having stored thereon software instructions for causing a system to perform a method for providing zero-knowledge range proofs for verifiable privacy-preserving queries is provided. The method comprises defining a bilinear group where a prover and a verifier implement proof systems, containing three prime-order groups $G_1$, $G_2$, $G_T$ and a bilinear map e defined by a pairing operation as: $G_1 \times G_2 \to G_T$, for each pair of elements $x_1$, $x_2$ belonging to $G_1$, $G_2$ respectively. The method further comprises receiving, by the prover, a query from the verifier. The method further comprises determining, by the prover, a range proof for a result of the query, implementing a variation of a bulletproof (BP) range proof system, over a bilinear group using Trusted Inner Pairing Product (TIPP) proof system for inner pairing products. The method further comprises generating, by the prover, a first inner product for the range proof, implementing the variation of the BP range proof system, for proving from the inner product of two scalar vectors l, r of size n, giving a proof for t is a scalar inner product defined as:

$$\hat{t} = \sum_{i=1}^{n} l_i r_i \in Z_p.$$

The method further comprises generating, by the prover, a second inner product for the range proof, implementing a trusted inner pairing product (TIPP) proof system, from two vectors A, B of size m that belong to $G_1$, $G_2$ respectively, using the bilinear map e, wherein the second inner product is defined as:

$$Z := e(A, B) = \prod_{i=1}^{n} e(A_i, B_i) \in G_T.$$

The method further comprises combining, by the prover, settings of the implemented variation of the BP range proof system and the implemented TIPP proof system by utilizing G as a first group of the bilinear group as: $G=G_1$. The method further comprises defining, by the prover, two vectors in the groups $G_1$, $G_2$ such that a relationship between the first inner product from the implemented variation of the BP range proof system and the second inner product from the implemented TIPP proof system is proven by embedding the scalar vectors l, r to groups $G_1$, $G_2$ respectively, by exponentiation as:

$$A = (g^{l_1}, \ldots, g^{l_n}) \in G_1^n, B = (h^{r_1}, \ldots, h^{r_n}) \in G_2^n.$$

This, by properties of the inner pairing product provides the relation for vectors in the group A, B with respect to the scalar inner product $\hat{t}$ is:

$$Z = \prod_{i=1}^{n} e(A_i, B_i) =$$
$$\prod_{i=1}^{n} e(g^{l_i}, h^{r_i}) = \prod_{i=1}^{n} e(g, h)^{l_i r_i} = e(g, h)^{\sum_{i=1}^{n} l_i r_i} = e(g, h)^{\hat{t}},$$

which implies that m=n. The method further comprises providing, by the prover, elements as proof to the verifier, including the element $\hat{t} \in \mathbb{Z}_p$, $Z \in G_T$ to allow the verifier to check the relation: $Z = e(g, h)\hat{t}$, as g, h are public generators of groups $G_1$, $G_2$ respectively.

In one or more embodiments, the system comprises a data owner device providing data. The system further comprises a client device providing a query related to the said data. The system further comprises a service provider device including a database configured to store the said data from the data owner device. Herein, the service provider device is configured to: receive the query from the client device, compute the query using the stored data in the database thereof and a zero-knowledge range proof for a result of the received query, by executing the method of claim 1, and provide the computed zero-knowledge range proof to the client device.

In one or more embodiments, in the system, the service provider device is the prover, and the client device is the verifier, and wherein the client device is configured to utilize the provided proof for verifying the computed zero-knowledge range proof using the stored data in the database thereof provided thereto.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

For a more complete understanding of example embodiments of the present disclosure, reference is now made to the following descriptions taken in connection with the accompanying drawings in which.

DETAILED DESCRIPTION

In the following description, for purposes of explanation, numerous specific details are set forth in order to provide a thorough understanding of the present disclosure. It will be apparent, however, to one skilled in the art that the present disclosure is not limited to the specific details described herein.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Unless specified otherwise in the following description, the terms "perform", "calculate", "computer-assisted", "compute", "establish", "generate", "configure", "reconstruct", and the like preferably relate to operations and/or processes and/or processing steps that change and/or generate data and/or convert the data into other data, wherein the data may be represented or be present in particular in the form of physical variables, for example in the form of electrical impulses. The expression "computer" should in particular be interpreted as broadly as possible in order in particular to cover all electronic devices having data processing properties. Computers may thus for example be personal computers, servers, programmable logic controllers (PLCs), hand-held computer systems, pocket PC devices, mobile radio devices and other communication devices able to process data in a computer-assisted manner, processors and other electronic data processing devices.

Moreover, in particular a person skilled in the art, with knowledge of the method claim/method claims, is of course aware of all routine possibilities for realizing products or possibilities for implementation in the prior art, and so there is no need in particular for independent disclosure in the description. In particular, these customary realization variants known to the person skilled in the art can be realized exclusively by hardware components or exclusively by software components. Alternatively and/or additionally, the person skilled in the art, within the scope of his/her expert ability, can choose to the greatest possible extent arbitrary combinations according to embodiments of the invention for hardware components and software components in order to implement realization variants according to embodiments of the invention.

Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

The present disclosure provides a system and a method for providing zero-knowledge range proofs for verifiable privacy-preserving queries. Zero-knowledge proofs are used for verifiable privacy-preserving analytic queries, where a query to secret data is answered along with a proof of correctness while keeping the data entries secret. The zero-knowledge proof is a proof system between two parties, a prover and a verifier, that allows to prove some statement without revealing anything beyond its validity. A range proof is a particular case of such proof systems that guarantees some secret value is in a range without revealing it. The method of the present disclosure comprises: receiving, by a prover, a query from a verifier; computing the query over the data and determining a zero-knowledge range proof for the correctness of the computations; providing, by a prover, the result and the proof to the verifier. Herein, the prover and verifier may be different computing system (computing hardware) which may be connected over a network (such as, Internet). The proposed scheme in the present disclosure provides a zero-knowledge proof system that uses range proof with logarithmic size and logarithmic verification time that is suitable for verifiable privacy-preserving queries such as MAX, MIN, $\leq$, $\geq$ operations. Additionally, the system allows to produce aggregation proofs, i.e., proving multiple values belong to a range using just one proof. The proposed scheme may also be used for other applications of range proof systems to improve the verification time, for example, confidential transactions. The range proof involves implementing the new TIPP Range proof system that is a variation of the BP range proof system in bilinear groups that uses an implementation of a TIPP proof system. The new proof system involves generating, by a third party, the SRS that is exactly the same as in TIPP proof system with two extra independent generators; using it by the prover to create the proofs; using it by the verifier to verify the proofs. The SRS is universal and updatable, i.e., can be re-used for many proofs and can be updated by the prover in case of not trusting the third party and generating a proof of the updating. The new proof system is logarithmic in the size of the proof and the verification time, and linear in the prover time, improving verification time of BP Range proof system by adding the use of bilinear groups.

Figure 1:
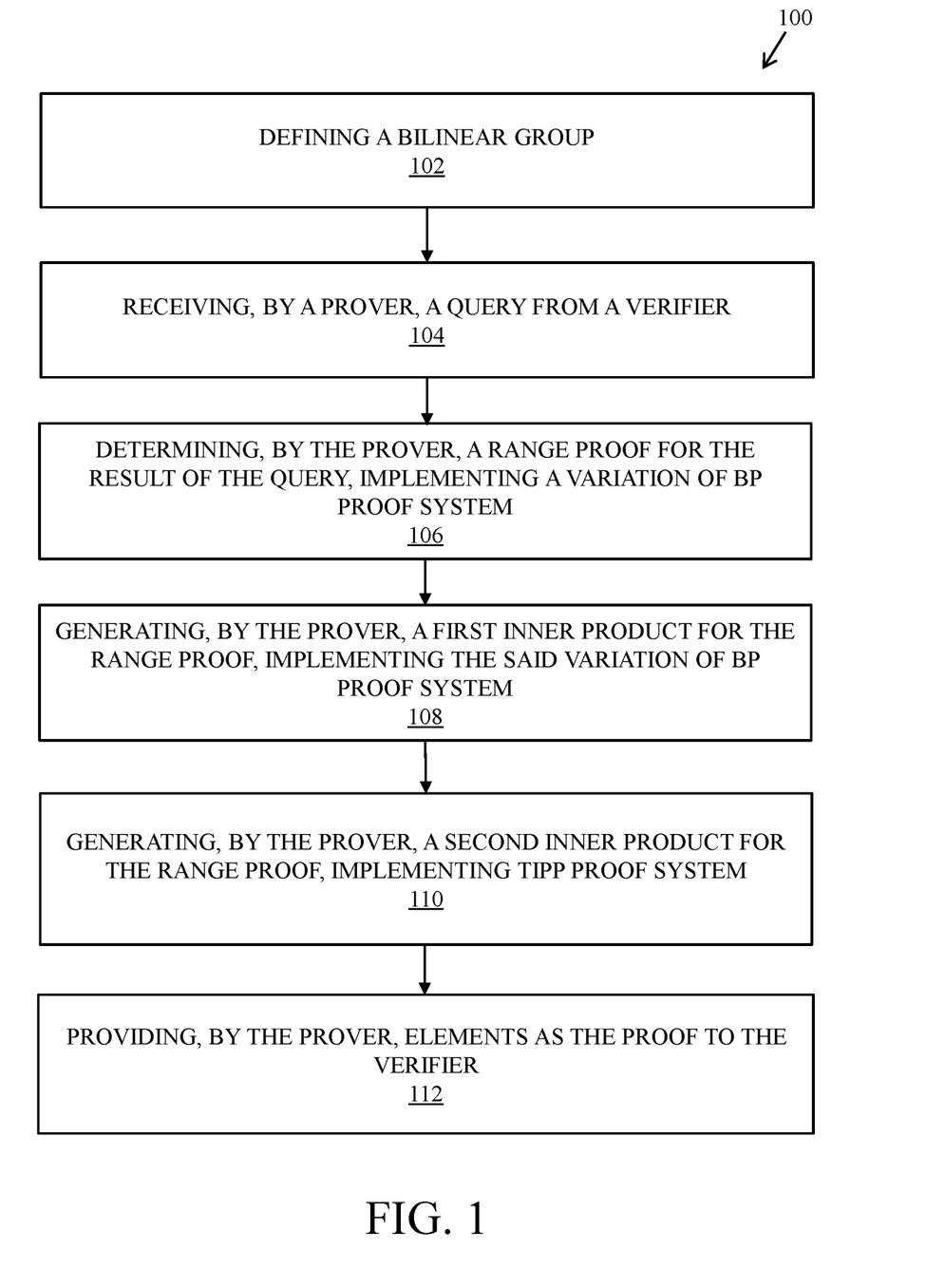
FIG. 1 illustrates a flowchart of a method for providing zero-knowledge range proofs, in accordance with one or more exemplary embodiments of the present disclosure.

FIG. 1 shows an exemplary embodiment of the present disclosure as a flowchart of a method 100 for providing zero-knowledge range proofs. In cryptography, a zero-knowledge proof or zero-knowledge protocol is a method by which one party (the prover) can prove to another party (the verifier) that a given statement is true while the prover avoids conveying any additional information apart from the fact that the statement is indeed true. The essence of zero-knowledge proofs is that it is trivial to prove that one possesses knowledge of certain information by simply revealing it; the challenge is to prove such possession without revealing the information itself or any additional information. In particular, the present method 100 provides a zero-knowledge proof scheme which is applicable for range proofs. The range proof is a particular case of zero-knowledge proofs that guarantees some secret value is in a given range without revealing it. The prover commits to the secret value and then proves that this value lies in a given interval. Range proofs are used in practise for anonymous credentials and confidential transactions for validating that transactions are positive without revealing the amounts involved.

The present method 100 provides a range proof scheme that implements a variation of the BP range proof system presented in "Bulletproofs" paper by Bünz et al. [See: Benedikt Bünz, Jonathan Bootle, Dan Boneh, Andrew Poelstra, Pieter Wuille and Greg Maxwell, Bulletproofs: Short Proofs for Confidential Transactions and More, IEEE SP 2018; incorporated herein in its entirety by reference] to bilinear groups combined with a TIPP argument [See: Benedikt Bünz, Mary Maller and Noah Vesely, Proofs for Inner Pairing Products and Applications, 2019; incorporated herein by reference in its entirety]. Herein, the present method 100 choses the BP range proof system over other recent protocols that achieve logarithmic verification time like Daza et al. [See: Vanesa Daza and Carla Rafols and Alexandros Zacharakis, Updateable Inner Product Argument with Logarithmic Verifier and Applications, Public Key Conference 2020] and Bünz et al. [See: Benedikt Bünz, Mary Maller and Noah Vesely, Proofs for Inner Pairing Products and Applications, 2019] because it is defined using prime-order groups, which are less restrictive compared to bilinear groups (on which recent protocols are defined). Further, the present method 100 chose the TIPP argument presented in Bünz et al. to be combined with the BP range proof system because it has better concrete verification complexities than the others, implying use of Bilinear groups. The proof proposed scheme by the present method 100 is applicable to verifiable privacy-preserving analytics as well as confidential transactions. It may be appreciated that in scenarios where a proof is computed once and proven by multiple verifiers, fast verification time would be required. Verifiable privacy-preserving analytic queries is one example of that, where a query to secret data is answered along with a proof of correctness while keeping the data entries secret. In that case, the client who sends the query is the verifier and the owner of the data who performs the proof is the prover. Moreover, in credit scoring, privacy schemes are added to credit scores by considering the lender as a verifier who asks for the range where the credit score of a borrower belongs to. Several lenders could be asked by the same borrower for a loan, then the prover just needs to compute it once and answer all the lenders with the range and same range proof that is verified by all of them.

The proof scheme as presented by the present method 100 is aggregable, i.e., for proving k values belong to the same range, say $[0, 2^n]$, a single proof can be computed with size and verification time logarithmic in n·k. Thereby, the proposed proof scheme achieves logarithmic time for verification while keeping the proof with logarithmic size. Thus, the present method 100 with logarithmic size and logarithmic verification time is suitable for verifiable privacy-preserving queries, such as MAX, MIN, Med, k-th item query operations. Additionally, the present method 100 allows to produce aggregation proofs, that is proving multiple values belong to a range using just one proof. It would be appreciated that the present method 100 may be used for other applications of range proof systems to improve the verification time, for example, confidential transactions without departing from the spirit and the scope of the present disclosure.

As per the embodiments of the present disclosure, the present method 100 implements two different proof systems that have been defined for different purposes to develop the proposed proof system. In particular, the present method 100 implements a range proof system and an inner product proof system. Herein, the said two proof systems are defined in different mathematical settings and provide different security guarantees. The present method 100 achieves the proposed proof system by strategically embedding one of the said two proof systems into the other. Specifically, the present method 100 defines the elements in the proposed proof system using both settings, and further provide details about how to mathematically relate the settings from the said two proof systems, as discussed in the proceeding paragraphs.

At step 102, the method 100 includes defining a bilinear group where a prover and a verifier implement proof systems, containing three prime-order groups $G_1$, $G_2$, $G_T$ and a bilinear map e defined by a pairing operation as:

$G_1 \times G_2 \rightarrow G_T$, for each pair of elements $x_1$, $x_2$ belonging to $G_1$, $G_2$ respectively. In particular, the method 100 includes creating, by a third party, the setup elements defining SRS which include the bilinear group, the generators, and the prover and verifier keys (pk, vk) used in the proposed scheme (as discussed in detail in the proceeding paragraphs) and a hash function H. Herein, the bilinear group contains the three prime-order groups $G_1$, $G_2$, $G_T$ and the bilinear map e defined by a pairing operation as: $G_1 \times G_2 \rightarrow G_T$, for each pair of elements $x_1$, $x_2$ belonging to $G_1$, $G_2$ respectively. It may be appreciated that the selection of the bilinear group, the generators, and the pk, vk is done in the setup phase computed by a third party.

At step 104, the method 100 includes receiving, by the prover, a query from the verifier. As discussed, the method 100 first involves creating, by a third party, the setup elements defining the Structured Reference String (SRS) which include the bilinear group, the generators, and the prover key (pk) and verifier key (vk) used in the proposed scheme, and the hash function H. In embodiments of the present disclosure, the prover has the choice of updating the keys (as discussed above) or not. The prover computes the query with the secret data and implements a proof of correctness of these computations, including computing 2 inner products.

Figure 2:
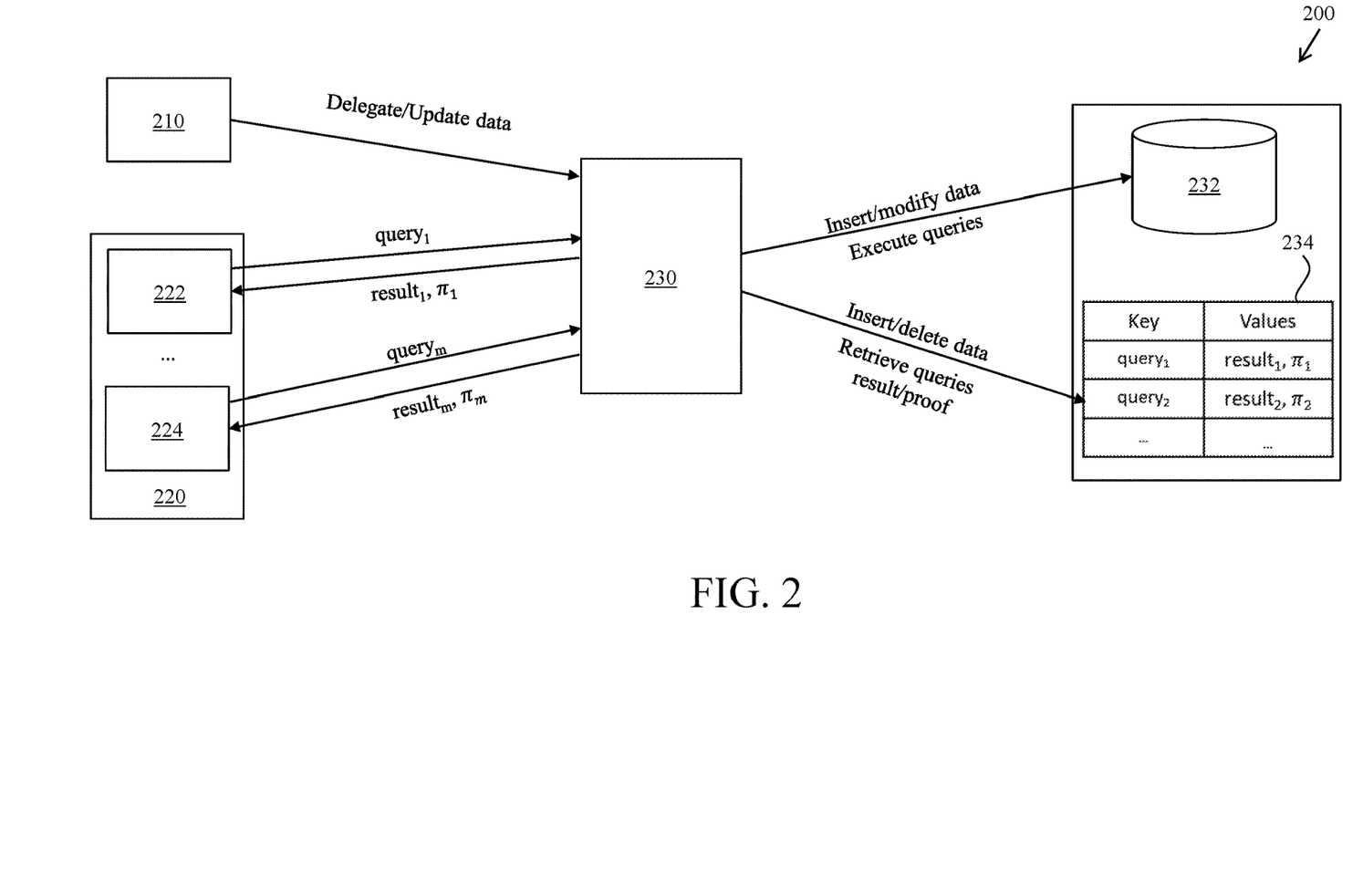
FIG. 2 illustrates a schematic diagram of a system for providing zero-knowledge range proofs, in accordance with one or more exemplary embodiments of the present disclosure.

Referring to FIG. 2, illustrated is a schematic diagram of a system (as represented by reference numeral 200) for providing zero-knowledge range proofs, in accordance with one or more exemplary embodiments of the present disclosure. As shown, the system 200 includes a data owner device 210 providing data. Herein, the data owner device 210 may own the data which is to be used for processing the query. The system 200 also includes a client device 220 providing the query related to the said data. It may be understood that the system 200 may include multiple client devices, which may provide same or different queries (as will be discussed later with some examples). For example, in the illustration of FIG. 2, the system 200 is shown to include two client devices, namely a first client device 222 and a second client device 224. The system 200 further includes a service provider device 230. Herein, the service provider device 230 may provide the computing power to process the query(ies), as received from the client device(s) 220. For this purpose, in one or more examples, the service provider device 230 may be a central server or the like. Also, as shown, the service provider device 230 includes a database 232 configured to store the said data from the data owner device 210. Further, in embodiments of the present disclosure, the service provider device 230 includes a key-value datastore 234 configured to store previously executed queries along with corresponding zero-knowledge range proofs. It may be appreciated that in the present system 200, the service provider device 230 is the prover, and the client device 220 is the verifier.

At step 106, the method 100 includes determining, by the prover, a range proof for a result of the query, implementing a variation of the BP range proof system, over the bilinear group. In particular, the method 100 includes determining, by the prover, a range proof for the correctness of the computation of the query, implementing the proposed proof system, referred to as the Trusted Inner Pairing Product (TIPP) range proof system (as discussed in more detail in the proceeding paragraphs) over a bilinear group which involves a variation of the BP range proof system over a bilinear group. More specifically, the method 100 includes determining, by the prover, the result of the query and parsing the value to be proven belongs to the range to the vectors of bits $a_L$, $a_R$ defined as in BP range proof system.

As used herein, the BP range proof system is a non-interactive zero-knowledge proof protocol with very short proofs and without a trusted setup. The proof size is only logarithmic in the witness size. The BP range proof system is especially well suited for efficient range proofs on committed values: enabling proving that a committed value is in a range using only 2 $\text{Log}_2(n)+9$ group and field elements, where n is the bit length of the range. In the BP range proof system, proof generation and verification times are linear in n. Moreover, the BP range proof system supports aggregation of range proofs, so that a party can prove that m values lie in a given range by providing only an additive $O(\log(m))$ group elements over the length of a single proof.

In the present embodiments, the method 100 comprising implementing the variation of the BP range proof system which involves 2 independent generators of $G_1$, one independent generator of $G_T$, and n generators of $G_1$ and $G_2$. Herein, the said independent generators of $G_1$ are used for computing Pedersen commitments and the rest for computing the perfectly hiding TIPP commitment, with both types of commitments being used for generating a zero-knowledge range proof. Additionally, or alternatively, implementing the TIPP Range proof system involves n generators of TIPP setup at each group $G_1$, $G_2$ and an independent generator in $G_T$. Herein, the said generators are used for the new perfectly hiding TIPP commitment for generating some elements of the zero-knowledge range proof. Further, the said generators are reusable for providing zero-knowledge range proofs for different queries. The elements of TIPP setup used in the new scheme are updatable, which allows the prover to reuse the setup elements or update them in case they do not trust who produced them. As may be appreciated, the Range proof system setup is universal and updatable once the value n is fixed.

Herein, the bilinear group contains three prime-order groups. A prime-order group, or cyclic group of prime order, is any of the following equivalent things: (i) it is a cyclic group whose order is a prime number, (ii) it is isomorphic to the quotient of the group of integers by a subgroup generated by a prime number. In the present embodiments, the elements of the prime-order group G are points of an elliptic curve. It may be contemplated by a person skilled in the art that for an elliptic curve G: (i) two elliptic curve element can be added, like for $g0 \in G$ and $g1 \in G$ $g1 \in G$: $h=g0+g1$; and (ii) an element g E G can be multiplied with a scalar a E Fp, where p is the curve order of G (i.e., the number of elements): h=ag. Another important property is that there is no efficient algorithm to compute "discrete logarithms". The meaning of this is that given h and g with the property that h=ag, if a is not known, it is computationally infeasible to find it, which is also known as a being the discrete logarithm of h with respect to g. Pedersen commitments security is based on this infeasibility.

Herein, the first inner product is generated from two scalar vectors l, r of size n as a scalar inner product. In the present examples, the scalar inner product is defined as:

$$\hat{t} = \sum_{i=1}^{n} l_i r_i \in Z_p.$$

It may be understood by a person skilled in the art that a core of the BP range proof system proof system is the Inner Product Argument, which is a trick that allows a prover to convince a verifier of the correctness of an "inner product".

An inner product is the component by component product of two vectors. The inner product arguments in the BP range proof system work on Pedersen Commitments. Herein, the commitments are part of an elliptic curve and do not require a trusted setup. The basic strategy of the Inner Product Argument in the BP range proof system is "divide and conquer". That is, take the problem and translated it to an equivalent problem of knowing two vectors and their inner product and instead of completely revealing them, turn it into smaller vectors and inner products in a recursive way. After $\log_2 n$ steps, the vectors become two scalars (vectors of dimension 1) that can simply reveal everything and prove that the instance is correct for them. At each step, the vector size halves. The method 100 uses same strategy but works with Perfectly Hiding TIPP commitments and computations are done in a bilinear group.

At step 108, the method 100 includes generating, by the prover, a first inner product for the range proof, implementing the variation of the BP range proof system, for proving from two scalar vectors l, r of size n giving a proof for t is a scalar inner product defined as:

$$\hat{t} = \sum_{i=1}^{n} l_i r_i \in Z_p.$$

Herein, the definition of the first inner product for the range proof, implementing the BP range proof system, from two scalar vectors l, r of size n similarly to same vectors in the BP range proof system such that as their scalar inner product, defined as:

$$\hat{t} = \sum_{i=1}^{n} l_i r_i \in Z_p,$$

expresses the range condition. Additionally, or alternatively, the method 100 includes generating, by the prover, the vectors $a_L$, $a_R$ that express these conditions and the blinding factors and computing the commitments to them and to vectors $a_L$, $a_R$: $S, \hat{A} \in G_T$, respectively. The method 100 also includes defining the polynomials l(X), r(X) that contain the vectors $a_L$, $a_R$ masked with the blinding factors and the polynomial t(X) that is the inner product of l(X), r(X) of degree 2, and computing the commitments to the coefficients $t_1$, $t_2$ of t(X): $T_1$, $T_2 \in G_1$, respectively. The method 100 further includes generating by the prover, a pseudorandom value x obtained by hashing the statement and the commitments up to that step and evaluating the polynomials to this value, to obtain the two scalar vectors l=l(x), r=r(x) of size n mentioned above, that and produce the scalar inner product defined as:

$$\hat{t} = t(x) = \sum_{i=1}^{n} l_i r_i \in Z_p.$$

Herein, the bilinear group contains three prime-order groups $G_1$, $G_2$, $G_T$ and a bilinear map e. Further, herein, the bilinear map e is defined by a pairing operation as: $e: G_1 \times G_2 \rightarrow G_T$, for each pair of elements $x_1$, $x_2$ belonging to $G_1$, $G_2$ respectively. Herein, the bilinear map e associates two elements of $G_1$, $G_2$ in $G_T$. Specifically, the bilinear map e associates two elements $x_1 \in G_1$, $x_2 \in G_2$ in $G_T$. In the present embodiments, the defined bilinear group is a structured group. Further, in the present embodiments, the pairing operation e is bilinear (linear in both components): for all $g^a \in G_1$, $h^b \in G_2$, $e(g^a, h^b) = e(g^{ab}, h) = e(g, h^{ab}) = e(g, h)^{ab}$. The TIPP range proof system uses the pairing operation, so the inner product of two group vectors happens in the exponent between two vectors.

In the present examples, implementing the TIPP proof system involves computing 2n generators g, $g^\alpha, \ldots, g^{\alpha^{2n-1}}$, $g^\beta$ in $G_1$ and 2n generators h, $h^\beta, \ldots, h^{\beta^{(2n-1)}}$, $h^\alpha$ in $G_2$, and wherein the said generators (or specifically even powers of said generators) are monomials in exponent, thus the even powers and $g^\beta$, $h^\alpha$ forming an updatable Structured Reference String (SRS). Further, in the present embodiments, the said generators form the same SRS for providing zero-knowledge range proofs for different queries, while implementing the TIPP proof system. It may be appreciated by a person skilled in the art that this SRS is to be generated outside of the protocol in a one-time manner. This property allows the prover to update the setup at any point and provide a proof of the update have been done correctly, so the SRS can be considered uncorrupted as long as the updater or an old SRS were honest.

Further, at step 110, the method 100 includes generating, by the prover, a second inner product for the query, implementing a trusted inner pairing product (TIPP) proof system, from two vectors A, B of size m that belong to $G_1$, $G_2$ respectively, using the bilinear map e, wherein the second inner product is defined as:

$$Z = e(A, B) = \prod_{i=1}^{n} e(A_i, B_i) \in G_T,$$

producing an element in the group. It may be contemplated that an inner product argument proves that an inner product relation holds between committed vectors. The TIPP proof system presents a new construction of inner product arguments for pairing-based languages that yields a logarithmic time verifier, which is a significant improvement over the linear time verifier as previously known. Generally, the TIPP proof system provides an inner pairing product argument that proves $Z \in G_T$ is the inner pairing product between committed vectors $$A \in G_1^m \text{ and } B \in G_2^m.$$

Herein, the bilinear map is a function combining elements of two vector spaces to yield an element of a third vector space, and is linear in each of its arguments. Such groups with bilinear maps have been widely used in the field of cryptography in recent years to construct a plethora of protocols.

Now, as discussed, the present method 100 combines two different proof systems to develop the proposed proof system, that is, the variation of the BP range proof system and the TIPP proof system, which have been defined in the art for different purposes. It may be appreciated by a person skilled in the art that there would be challenges to combine the teachings of the said two known techniques to develop the proposed proof system. For instance, these constructions are designed in different settings. Some elements are common to the BP range proof system and those are generated in a single group, that is an elliptic curve, like in the original scheme; while the elements of the TIPP proof system and the rest of the elements in BP range proof are generated in a more complex structure called bilinear group, which consists in three groups and a special operation called pairing (e) defined between them. In the present disclosure, a new commitment scheme has been defined and used based on the TIPP commitment scheme that holds the hiding property. It is used to produce some of the commitments in the original BP range proof system but given in $G_T$ so that the verifier can check the original BP range proof checks in $G_T$ instead of $G_1$ and relate them with the elements defined in TIPP proof system.

Also, the inner product of the BP range proof system and the inner product of the TIPP proof system at each construction belong to different sets. Specifically, in the BP range proof system, the inner product is a scalar produced by the component-wise multiplication of two vectors in a field; while in the TIPP proof system, the vectors are group elements from different groups ($G_1$, $G_2$) and the result of the inner product is an element of the third group in the bilinear group ($G_T$), which is called the inner pairing product. Further, although both constructions are proven to be secure, but these constructions use different definitions of security. In other words, while both constructions guarantee soundness that an adversary cannot convince the verifier of a false statement if they does not have a valid witness; however, for privacy, it may only be the BP range proof system that may guarantee the zero-knowledge property, that from the proof and the commitment the verifier cannot gain more information about the witness, which may not be the case with the TIPP proof system. However, the new scheme presented in the disclosure is zero-knowledge because of the blinding factors as used in the original BP range proof system, and soundness by the binding property of the commitments TIPP and Perfectly Hiding TIPP commitment schemes and the Discrete Logarithmic assumption in the groups in the bilinear group.

In one or more embodiments, the method 100 further includes combining, by the prover, settings of the implemented variation of the BP range proof system and the implemented TIPP proof system by utilizing G as a first group of the bilinear group as: $G=G_1$. This is one of the pieces that allows to combine the elements of the BP range proof system in the present construction generated in the bilinear group instead of a single group with that of the elements of the TIPP proof system which were already defined in the bilinear group. It may be contemplated by a person skilled in the art that this does not add extra requirements for the bilinear group because in the original paper (Bünz et al., 2019), the Discrete Logarithm assumption in G is the only condition needed for the security of the BP range proof system. On the other hand, the security of the TIPP proof system is based among other assumption on the Strong Diffie-Hellman (SDH) assumption, which implies the Discrete Logarithm (DLOG) assumption. Then, this combination does not add requirements to the TIPP proof system because DLOG problem was already required to be hard in $G_1$. In one or more embodiments, implementing the new system as a combination of BP range proof system and TIPP proof system involves generating both public parameters (2 independent generators in $G_1$, and 2n even powers of α, β in $G_1$ and $G_2$) and an independent generator in $G_T$ for the Perfectly Hiding TIPP commitment defined in $G_T$.

At step 112, the method 100 includes providing, by the prover, elements as the proof to the verifier, including the element $\hat{t} \in \mathbb{Z}_p$, $Z \in G_T$ to allow the verifier to check the relation: $Z=e(g, h)^{\hat{t}}$, as g, h are public generators of groups $G_1$, $G_2$ respectively. In particular, the the prover provides the proof, that contains the Perfectly Hiding TIPP commitments S, Â, the Pedersen commitments $T_1$, $T_2$, the scalar elements μ, $\tau_x$, $\hat{t}$ that allow to prove the range, and the elements of a TIPP proof (which include the final A, B 1-dimensional vectors, the final commitment keys of dimension 1 v, w, the TIPP commitments at each step C, $C_{L,1}$, $C_{R,1}$, ..., $C_{L,\log n}$, $C_{R,\log n}$, and the proofs for well-formedness of the final keys. The method 100 also includes receiving, by the verifier, the proof implemented by the prover. The method 100 further includes checking, by the verifier, the proof by (1) computing the same pseudorandom values as the prover, (2) checking that $\hat{t}$ corresponds to the evaluation at point x of a polynomial that has the elements committed in $T_1$, $T_2$ and the secret value contained in the 0-coefficient with a special form, (3) checking the commitment of vectors A, B corresponds to the vectors committed in: S, Â, (4) the inner pairing product of: A, B is correctly computed, and (5) the relation between the inner pairing product and the scalar inner product by checking that the equation $Z=e(g, h)^{\hat{t}}$ holds.

The Perfectly Hiding TIPP commitment scheme as used in the present method 100 is a new commitment scheme defined for the present disclosure and it is perfectly hiding and computationally binding commitment scheme. Perfectly hiding guarantees that even an adversary with unlimited computational power cannot gain information about the values committed to from knowing the commitment. Binding is guaranteed by the same assumptions as TIPP commitment scheme. Further, in the present disclosure, the SRS is updatable which allows the prover to derive a new SRS', create a proof for correctness of SRS' respect to previous SRS, generate the range proof with the elements in SRS'. The verifier receives the SRS' along with the proof for correctness, the result of the query and the range proof for correctness of the computation of the query, and checks both proofs using previous SRS for the proof of correctness of SRS' and SRS' for the range proof.

In some configurations, the method 100 includes verifying, by the verifier, the proof. This involves defining, by the prover, relationship between the first inner product from the implemented variation of the BP range proof system and the second inner product from the implemented TIPP proof. Specifically, the method 100 includes defining, by the prover, the vectors A, B for TIPP such that the relationship between the first inner product defined from the original idea in BP range proof system and the second inner product (inner pairing product) from the implemented TIPP proof can be checked. This is done by embedding the scalar vectors l, r to groups $G_1$, $G_2$ respectively, by exponentiation as:

$$A = (g^{l_1}, \ldots, g^{l_n}) \in G_1^n, B = (h^{r_1}, \ldots, h^{r_n}) \in G_2^n.$$

This allows the inner product of the BP range proof system (which is scalar) and the inner pairing product of the TIPP proof system (which is an element of the third group in the bilinear group) to be implemented together. In some embodiments, the method 100 further includes defining, by the prover, commitments that are used in the BP range proof system in the group $G_T$, instead of $G_1$, and the verifier checking the equations in $G_T$ instead of $G_1$ in consequence.

Further, in some configurations, the method 100 includes generating, by the prover, an inner pairing product of the scalar vectors l, r as per the implemented TIPP proof system. Specifically, the method 100 includes generating, by the prover, an inner pairing product of the vectors that embed the scalar vectors l, r in the exponent as per the implemented TIPP proof system. Herein, as discussed, the TIPP proof system provides an inner pairing product argument that proves $Z \in G_T$ is the inner pairing product between committed vectors $$A \in G_1^m \text{ and } B \in G_2^m.$$

Further, the method 100 may include applying, by the prover, properties of the inner pairing product to obtain a relation for vectors (inner pairing product of vectors) in the group A, B with respect to the scalar inner product $\hat{t}$ as:

$$Z = \prod_{i=1}^{n} e(A_i, B_i) =$$
$$\prod_{i=1}^{n} e(g^{l_i}, h^{r_i}) = \prod_{i=1}^{n} e(g, h)^{l_i r_i} = e(g, h)^{\sum_{i=1}^{n} l_i r_i} = e(g, h)^{\hat{t}},$$

such that m=n (which have to be a power of 2 in both constructions). As discussed, the inner product argument allows a prover to prove that the prover has correctly computed such product to a verifier, without the verifier performing this computation. Now with the inner pairing product argument, an inner product relationship in the exponent can also be proved.

Further, in some configurations, the method 100 includes providing, by the prover, the element $Z=e(g, h)^{\hat{t}}$ and scalar inner product $\hat{t}$ to the verifier along with the rest of the elements of the proof. In the present embodiments, these elements should hold the relation $Z=e(g, h)^{\hat{t}}$. That is, the SRS defined is universal once the size of n is fixed. In other words, the proposed proof system is updatable and universal (i.e., it can be used for any proof without the necessity of changing it) once the size n is fixed. Herein, the verifier may utilize the provided Z and $\hat{t}$ values (the provided verification key and the proof elements) for verifying the relation between both inner products. Herein, the verifier only has to do one exponentiation in $G_T$ to verify that. The verifier also needs to check the other three range proof conditions, (1) the value $\hat{t}$ corresponds to the evaluation at same point x as polynomials l(X), r(X) of a polynomial which coefficients are committed and passed to the verifier as part of the proof, which is checked in the group $G_1$; (2) the polynomials l(X), r(X) are correctly computed using the Perfectly Hiding TIPP commitments given in $G_T$; and (3) the Inner Pairing Product Z corresponds to the inner pairing product of vectors A, B. Herein, implementing the Perfectly Hiding TIPP commitment involves the TIPP commitment keys and an independent generator in $G_T$.

Referring to the FIG. 2, in the system 200, the service provider device 230 is configured to receive the query from the client device 220. The service provider device 230 is further configured to compute a result for the received query using the stored data in the database 232 thereof, and zero-knowledge range proof by executing the method 100 (as explained in the preceding paragraphs). The service provider device 230 is further configured to provide the computed zero-knowledge range proof to the client device 220. In the system 200, it may be understood that the service provider device 230 is the prover, and the client device 220 is the verifier. In particular, herein, the client device 220 is configured to utilize the provided result of the query and the computed zero-knowledge range proof (as provided by execution of the present method 100) for verifying it. In verifiable privacy-preserving analytic queries, the range proofs are used to compute Max, Min, Median, k-th query.

For example, if a client device 220 sends a Max query to the service provider device 230, the service provider device 230 computes the maximum of k values, $M = \text{Max } v_i$, and a TIPP Range proof w as an aggregation of k−1 proofs for Max $v_i \geq 0$ for all $i \in [1, k-1]$, i.e., an aggregated proof for Max $v_i \in [0, 2^n]$ for all i, for a certain bound n (a power of 2). The size of this proof w and the verification time are logarithmic in k·n.

In the following description, details of the algorithms of the involved parties have been described for implementing the zero-knowledge range proof for correctness of the query computation. If the query is the Max of a set of k values and the result is M, the described scheme in the following is for proving that some secret value v is such that $v \leq M$, more precisely the proof is for $0 \leq v - M$, i.e., $v - M \in [0, 2^n]$. Herein, for aggregation of k−1 proofs (one for each value that is not M), n·k instead of n has been considered. The setup is done at the beginning, and it does not change even when the database is updated, this is why herein a big enough n value is fixed considering a maximum range length and a maximum number of aggregated proofs.

Further, as illustrated and discussed previously in reference to FIG. 2, the service provider device 230 further includes the key-value datastore 234 which is configured to store previously executed queries along with corresponding zero-knowledge range proofs and corresponding proof-of-correctness; and the service provider device 230 is further configured to store the received query along with the computed result of the query and corresponding zero-knowledge range proof-of-correctness therefor in the key-value datastore 234. In the present embodiments, the data owner device 210 may update the said data. In such case, the service provider device 230 is configured to determine one or more previously executed queries along with corresponding one or more zero-knowledge range proofs stored in the key-value datastore 234 related to the updated data. The service provider device 230 is further configured to delete the determined one or more previously executed queries along with the corresponding one or more zero-knowledge range proofs from the key-value datastore 234, in case of updation of the said data. In other words, as discussed, the data owner device 210 outsource data to the service provider device 230 or update the data already sent to the service provider device 230. In the present system 200, the service provider device 230 stores the data received in the database 232 and erase the key-value datastore 234 associated with data received from the data owner device 210.

According to embodiments of the present disclosure, in case of two client devices 222, 224 sending same queries, the system 200 allows for much faster execution of such verifiable privacy-preserving aggregated queries. That is, if the first client device 222 sends a query (Q), which is a computer-readable query, to the service provider device 230; and the service provider device 230 executes Q, computes a TIPP Range proof $\pi$ for Q, stores Q with the corresponding values (result, proof) in the key-value datastore 234, and answer with the result and the proof. Then, the first client 222 can verify that the result is correct using the proof received from the service provider device 230. Now, if the second client device 224 sends the same query (Q) to the service provider device 230, since Q is present in the key-value datastore 234, the service provider device 230 can directly answer with the result and the proof obtained from the key-value datastore 234, and the second client device 224 can verify that the result is correct using the proof received from the service provider device 230.

To summarize, in the system 200 of the present disclosure, the data owner device 210 is the party who owns the data and stores it in the service provider device 230. The data owner device 210 is responsible for operations including, but not limited, (i) delegate data to the service provider device 230; and (ii) update data. The client device 220 is a party that sends a query to the service provider device 230; and when the client device 220 receives the answer to the query, verifies it using the proof of correctness received therewith. The service provider device 230 is the party who stores the database 232, updates it, performs the operations on the data and compute the proofs of their correctness. The service provider device 230 also stores the key-value datastore 234 of all the queries that receives from the client device(s) 210. In particular, the service provider device 230 is configured to: (i) when receiving data from the data owner device 210, store the data in the database 232; (ii) when updating data from the data owner device 210, update the database 232 and erase the queries stored in the key-value datastore 234 that are computed with data involved in the update; and (iii) when receiving a query from the client device 220: if the query is stored in the key-value datastore 234 of queries, then the service provider device 230 answers with the corresponding value stored, which contains the result of the query and the proof of correctness; otherwise, the service provider device 230 computes the result of the query and a proof of correctness of it; stores the query, the result and the proof in the key-value datastore 234; and answers the client device 220 with the result and the proof of correctness.

The present system 200 may be utilized in financial applications where users need to provide answer to third party credit scoring type of query without disclosing sensitive data contained in the dataset that are not necessary to compute the credit score. For example, the TIPP range proofs may be used for providing a proof for some Maximum/Minimum value of a table asked by a client, without disclosing any other value in the table. The present system 200 may also be utilized in financial applications where the credit score computation is delegated. Since the exact value is not necessary, because the creditors have established some ranges for the credit score to classify the borrower in one category, the TIPP range proof may be used for providing a proof of the credit score belongs to one of the established ranges without disclosing the credit score value. In that case, the TIPP range proof may be sent along the range and a proof of correctness of the computations to obtain the credit score. It may be appreciated that in credit scoring, the lender may act as the client device 220 that wants to know to which range the credit score associated to a borrower belongs to. The service provider device 230 computes the credit score, stores the query, and answers the lender with the range where the credit score belongs and a range proof (i.e., the proof of correctness for the computations). In the present example, the client device 220 may include other users, regulators or creditors; and the service provider device 230 may include Treasury & Custody Account (TCA) that stores digital data assets of some users, that can answer analytical requests from other users and regulators disclosing just the necessary user's data. It is considered that the TCA has an internal library that processes the query, computes the result and the zero-knowledge proof for correctness of the computation, then the TCA answers the query of the user with the result and the proof.

Figure 3:
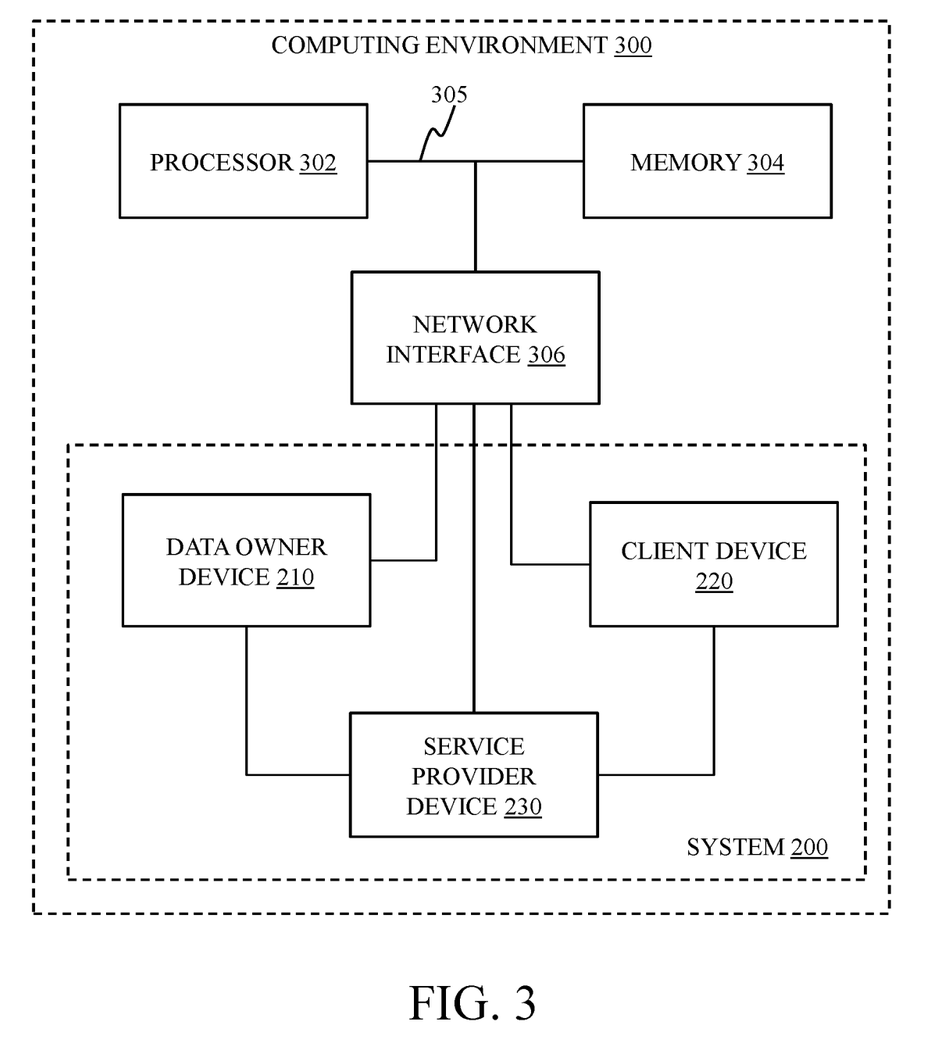
FIG. 3 illustrates a schematic diagram of a computing environment in which the system of FIG. 2 is implemented, in accordance with one or more exemplary embodiments of the present disclosure.

FIG. 3 illustrates a block diagram of a computing environment 300 in which the system 200 of the present disclosure may be implemented, in accordance with one or more exemplary embodiments of the present disclosure. In an embodiment, as discussed, the computing environment 300 may be the computing device on which the system 200, or part of it, may be executed, with the two terms being interchangeably used hereinafter. In particular, the system 200 may reside on or may be executed by one or multiple computing devices (such as the computing environment 300). The computing device 300 includes a processor 302, a memory 304, and a network interface 306. The network interface 306 allows communication between data owner device 210, client device 220 and/or service provider device 230. The computing device 300 helps with execution of operations of the data owner device 210, the client device 220 and/or the service provider device 230 of the system 200. Examples of computing device 300 may include, but are not limited to, a personal computer(s), a laptop computer (s), mobile computing device(s), a server computer, a series of server computers, a mainframe computer(s), or a computing cloud(s). In general, the "computing device" in connection with embodiments of the present may be understood to mean for example a computer or a computer system, a client, a smartphone, a device or a server that are in each case arranged outside the blockchain or are not participants in the distributed database (for example the blockchain) (that is to say do not perform operations with the distributed database or only query it without however performing transactions, inserting data blocks or calculating proof of work). As an alternative, the computing device 300 may also in particular be understood to mean a node of the distributed database (as explained later in the description).

In certain implementations, the computing device 300 may be a physical or virtual device. In many implementations, the computing device 300 may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic.

In an example, the computing device 300 may be configured to run a computer-program product programmed for performing the said purpose. In another example, the computing device 300 may be a non-transitory computer readable medium on which program code sections of a computer program are saved, the program code sections being loadable into and/or executable in a system to make the system execute the steps for performing the said purpose. The computing device 300 may be incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the computing device 300 can be implemented in a single chip. The system of the present disclosure as discussed in the preceding paragraphs may include or be embodied in the computing device 300. It may be appreciated that the two systems and (and the corresponding components/elements) may be equivalent for the purposes of the present disclosure.

In one embodiment, the computing device 300 includes a communication mechanism 305 (such as a bus 305) for passing information among the components of the computing device 300. Herein, in particular, the processor 302 has connectivity to the bus 305 to execute instructions and process information stored in the memory 304. The processor 302 may include one or more processing cores with each core configured to perform independently. A multi-core processor enables multiprocessing within a single physical package. Examples of a multi-core processor include two, four, eight, or greater numbers of processing cores. Alternatively, or in addition, the processor 302 may include one or more microprocessors configured in tandem via the bus 305 to enable independent execution of instructions, pipelining, and multithreading. The processor 302 may also be accompanied with one or more specialized components to perform certain processing functions and tasks such as one or more digital signal processors (DSP), or one or more application-specific integrated circuits (ASIC). A DSP typically is configured to process real-world signals (e.g., sound) in real time independently of the processor 302. Similarly, an ASIC can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 302 refers to a computational element that is configured to respond to and process instructions that drive the system 200. The processor 302 may cause the data management module 104 and the query execution and verification module 106 to perform their respective functions as described. In operation, the processor 302 is configured to perform all the operations of the system 200. Examples of implementation of the processor 302 may include, but is not limited to, a central processing unit (CPU), a microprocessor, a microcontroller, a complex instruction set computing (CISC) microprocessor, a reduced instruction set (RISC) microprocessor, a very long instruction word (VLIW) microprocessor, or any other type of processing circuit. Furthermore, the processor 302 may refer to one or more individual processors, processing devices and various elements associated with a processing device that may be shared by other processing devices.

The memory 304 refers to a storage medium, in which the data or software may be stored. The memory 304 includes both dynamic memory (e.g., RAM, magnetic disk, writable optical disk, etc.) and static memory (e.g., ROM, CD-ROM, etc.) for storing executable instructions that when executed perform the method steps described herein for writing and retrieval of data in a distributed ledger. In particular, the memory 304 includes a module arrangement to perform steps for writing and retrieval of data in a distributed ledger. The memory 304 also stores the data associated with or generated by the execution of the inventive steps. For example, the memory 304 may store the instructions that drives the system 200. Examples of implementation of the memory 304 may include, but are not limited to, Electrically Erasable Programmable Read-Only Memory (EEPROM), Read Only Memory (ROM), Hard Disk Drive (HDD), Solid-State Drive (SSD), and/or CPU cache memory.

Herein, the memory 304 may be volatile memory and/or non-volatile memory. The memory 304 may be coupled for communication with the processor 302. The processor 302 may execute instructions and/or code stored in the memory 304. A variety of computer-readable storage media may be stored in and accessed from the memory 304. The memory 304 may include any suitable elements for storing data and machine-readable instructions, such as read only memory, random access memory, erasable programmable read only memory, electrically erasable programmable read only memory, a hard drive, a removable media drive for handling compact disks, digital video disks, diskettes, magnetic tape cartridges, memory cards, and the like.

In some implementations, the instruction sets and subroutines of the system 200, which may be stored on a storage device, such as a storage device coupled to computer, may be executed by one or more processors and one or more memory architectures included within computer. In some implementations, one or more storage devices may include but are not limited to: hard disk drives; flash drives, tape drives; optical drives; RAID arrays; random access memories (RAM); and read-only memories (ROM). Examples of user devices (and/or computer) may include, but are not limited to, a personal computer, a laptop computer, a smart/data-enabled, cellular phone, a notebook computer, a tablet, a server, a television, a smart television, a media capturing device, and a dedicated network device.

In some implementations, the computing device 300 may include a data store, such as a database (e.g., relational database, object-oriented database, triple store database, etc.) and may be located within any suitable memory location, such as storage device coupled to computer. In some implementations, data, metadata, information, etc. described throughout the present disclosure may be stored in the data store. In some implementations, computer may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, the system 200 may be a component of the data store, a standalone application that interfaces with the above noted data store and/or an applet/application that is accessed via client applications. In some implementations, the above noted data store may be, in whole or in part, distributed in a cloud computing topology. In this way, computer and storage device may refer to multiple devices, which may also be distributed throughout the network.

In some implementations, the computing device 300 may execute an application for writing and retrieval of data in a distributed ledger. In some implementations, the system 200 and/or application may be accessed via one or more of client applications. In some implementations, the system 200 may be a standalone application, or may be an applet/application/script/extension that may interact with and/or be executed within an application, a component of application and/or one or more of client applications. In some implementations, the application may be a standalone application, or may be an applet/application/script/extension that may interact with and/or be executed within the system 200, a component of the system 200, and/or one or more of client applications. In some implementations, one or more of client applications may be a standalone application, or may be an applet/application/script/extension that may interact with and/or be executed within and/or be a component of the system 200 and/or application. Examples of client applications may include, but are not limited to, a standard and/or mobile web browser, an email application (e.g., an email client application), a textual and/or a graphical user interface, a customized web browser, a plugin, an Application Programming Interface (API), or a custom application. The instruction sets and subroutines of client applications which may be stored on storage devices coupled to user devices may be executed by one or more processors and one or more memory architectures incorporated into user devices.

In some implementations, one or more of client applications may be configured to effectuate some or all of the functionality of the system 200 (and vice versa). Accordingly, in some implementations, the system 200 may be a purely server-side application, a purely client-side application, or a hybrid server-side/client-side application that is cooperatively executed by one or more of client applications and/or the system 200.

In some implementations, one or more of client applications may be configured to effectuate some or all of the functionality of application (and vice versa). Accordingly, in some implementations, application may be a purely server-side application, a purely client-side application, or a hybrid server-side/client-side application that is cooperatively executed by one or more of client applications and/or application. As one or more of client applications the system 200, and application taken singly or in any combination, may effectuate some or all of the same functionality, any description of effectuating such functionality via one or more of client applications the system 200, application or combination thereof, and any described interaction(s) between one or more of client applications the system 200, application or combination thereof to effectuate such functionality, should be taken as an example only and not to limit the scope of the disclosure.

In some implementations, one or more of users may access the system 200 (e.g., using one or more of user devices) directly through the network. In some implementations, the network may be connected to one or more secondary networks, examples of which may include but are not limited to: a local area network; a wide area network; or an intranet, for example. In some implementations, the computing device 300 may be connected to the network through secondary network with phantom link line.

The network interface 306 includes suitable logic, circuitry, and interfaces that may be configured to communicate with one or more external devices, such as a server or another computing device. Examples of the network interface 306 may include, but is not limited to, an antenna, a network interface card (NIC), a transceiver, one or more amplifiers, one or more oscillators, a digital signal processor, and/or a coder-decoder (CODEC) chipset.

In some implementations, the various user devices may be directly or indirectly coupled to the network. For example, user device may be directly coupled to the network via a hardwired network connection. Alternatively, user device may be wirelessly coupled to the network via wireless communication channel established between user device and wireless access point (i.e., WAP) which in turn may be directly coupled to the network. WAP may be, for example, an IEEE 802.11a, 802.11b, 802.11g, 802.11ac, 802.11ae, Wi-Fi®, RFID, and/or Bluetooth™ (including Bluetooth™ Low Energy) device that is capable of establishing wireless communication channel between user device and WAP. In other examples, user device may be wirelessly coupled to the network via wireless communication channel established between user device and cellular network/bridge which may be directly coupled to the network. User devices may execute an operating system, examples of which may include but are not limited to, Android®, Apple® iOS®, Mac® OS X®; Red Hat® Linux®, or a custom operating system.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example, Bluetooth™ (including Bluetooth™ Low Energy) is a telecommunications industry specification that enables, e.g., mobile phones, computers, smart phones, and other electronic devices to be interconnected using a short-range wireless connection. Other forms of interconnection (e.g., Near Field Communication (NFC)) may also be used.

It is to be understood that the system and computer-assisted method described herein may be implemented in various forms of hardware, software, firmware, special purpose processors, or a combination thereof. "Computer-assisted" in connection with embodiments of the present disclosure may be understood to mean for example an implementation of the method in which in particular a processor executes at least one method step of the method. One or more of the present embodiments may take a form of a computer program product comprising program modules accessible from computer-usable or computer-readable medium storing program code for use by or in connection with one or more computers, processors, or instruction execution system. A "module" or a "sub-module" in connection with embodiments of the invention may be understood to mean for example a processor and/or a storage unit for storing program commands. By way of example, the processor 302 is specifically configured so as to execute the program commands such that the processor 302 executes functions in order to implement or perform the method according to embodiments of the invention or a step of the method according to embodiments of the invention. For the purpose of this description, a computer-usable or computer-readable medium can be any apparatus that can contain, store, communicate, propagate, or transport the program for use by or in connection with the instruction execution system, apparatus, or device.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

The invention claimed is:

1. A computer-implemented method for providing zero-knowledge membership proofs for verifiable privacy-preserving queries in a computing system comprising a prover and a verifier, the prover and verifier each implementing proof systems, the method comprising:
defining a bilinear group containing three prime-order groups $G_1$, $G_2$, $G_T$ and a bilinear map e defined by a pairing operation as: $G_1 \times G_2 \rightarrow G_T$, for each pair of elements $x_1$, $x_2$ belonging to $G_1$, $G_2$ respectively;
receiving, by the prover, a query from the verifier;
determining, by the prover, a range proof for a result of the query, implementing a variation of a bulletproof (BP) range proof system, over the bilinear group;
generating, by the prover, a first inner product for the range proof, implementing the variation of the BP range proof system, for proving from two scalar vectors l, r of size n giving a proof for î is a scalar inner product defined as:

$$\hat{\imath} = \sum_{i=1}^{n} l_i r_i \in Z_p;$$

generating, by the prover, a second inner product for the range proof, implementing a trusted inner pairing product (TIPP) proof system, from two vectors A, B of size m that belong to $G_1$, $G_2$ respectively, using the bilinear map e, wherein the second inner product is defined as:

$$Z = e(A, B) = \prod_{i=1}^{n} e(A_i, B_i) \in G_T;$$

and providing by the prover, elements as the proof to the verifier, including the element $\hat{\imath} \in \mathbb{Z}_p$, $Z \in G_T$ to allow the verifier to check the relation: $Z=e(g, h)^{\hat{\imath}}$, as g, h are public generators of groups $G_1$, $G_2$ respectively, wherein the prover provides the result of the query and the elements as proof of correctness while maintaining privacy.

2. The method of claim 1 further comprising defining, by the prover, commitments that are used in the implemented variation of the BP range proof system in the group $G_T$, instead of $G_1$; and the verifier checking the equations in $G_T$ instead of $G_1$ in consequence.

3. The method of claim 1, wherein implementing the variation of the BP range proof system involves 2 independent generators of $G_1$, one independent generator of $G_T$, and n generators of $G_1$ and $G_2$, and wherein the said independent generators of $G_1$ are used for computing Pedersen commitments and the rest for computing perfectly hiding TIPP commitment and TIPP commitment, for generating a zero-knowledge range proof.

4. The method of claim 3, wherein the said independent generators are reusable for providing zero-knowledge range proofs for different queries.

5. The method of claim 1, wherein implementing the TIPP proof system involves 2n generators $g, g^a, \ldots, g^{a2^{n-1}}, g^\beta$ in $G_1$ and 2n generators $h, h^\beta, \ldots h^{\beta^{2n-1}}, h^a$ in $G_2$, and wherein even powers of said generators are monomials in exponent forming an updatable Structured Reference String (SRS).

6. The method of claim 5, wherein the said generators form same SRS for providing zero-knowledge range proofs for different queries, while implementing the TIPP proof system.

7. The method of claim 1, wherein the pairing operation e is bilinear: for all $g^a \in G_1$, $h^b \in G_2$, $e(g^a, h^b)=e(g^{ab}, h)=e(g, h^{ab})=e(g, h)^{ab}$.

8. The method of claim 1, wherein elements of the prime-order groups $G_1$, $G_2$ are points of an elliptic curve.

9. The method of claim 1, wherein the defined bilinear group is a structured group.

10. The method of claim 1, wherein the bilinear map e associates two elements $x_1 \in G_1$, $x_2 \in G_2$ to an element in $G_T$.

11. The method of claim 1, wherein the SRS defined is universal once the size of n is fixed.

12. A system comprising:
a data owner device providing data;
a client device providing a query related to the said data; and
a service provider device comprising a database configured to store the said data from the data owner device,
wherein the client device and service provider device comprise a prover and a verifier, the prover and verifier each implementing proof systems,
wherein the service provider device is configured to:
receive the query from the client device,
compute the query using the stored data in the database thereof and a zero-knowledge range proof for correctness of this computation, by executing a method comprising:
defining a bilinear group containing three prime-order groups $G_1$, $G_2$, $G_T$ and a bilinear map e defined by a pairing operation as: $G_1 \times G_2 \rightarrow G_T$, for each pair of elements $x_1$, $x_2$ belonging to $G_1$, $G_2$ respectively;
receiving, by the prover, a query from the verifier;
determining, by the prover, a range proof for a result of the query, implementing a variation of a bulletproof (BP) range proof system, over the bilinear group;
generating, by the prover, a first inner product for the range proof, implementing the variation of the BP range proof system, for proving from two scalar vectors l, r of size n giving a proof for $\hat{\imath}$ is a scalar inner product defined as:

$$\hat{\imath} = \sum_{i=1}^{n} l_i r_i \in Z_p;$$

generating, by the prover, a second inner product for the range proof, implementing a trusted inner pairing product (TIPP) proof system, from two vectors A, B of size m that belong to $G_1$, $G_2$ respectively, using the bilinear map e, wherein the second inner product is defined as:

$$Z = e(A, B) = \prod_{i=1}^{n} e(A_i, B_i) \in G_T;$$

and providing, by the prover elements as the proof to the verifier, including the element $\hat{\imath} \in \mathbb{Z}_p$, $Z \in G_T$ to allow the verifier to check the relation: $Z=e(g, h)^{\hat{\imath}}$, as g, h are public generators of groups $G_1$, $G_2$ respectively, and
provide the computed result of the query and the zero-knowledge range proof to the client device.

13. The system of claim 12, wherein the service provider device is the prover, and the client device is the verifier.

14. The system of claim 13, wherein the client device is configured to utilize the provided verification key and the elements of the proof which include the Z and $\hat{t}$ values for verifying the computed zero-knowledge range proof provided thereto.

15. The system of claim 14, wherein the service provider device further comprises a key-value datastore configured to store previously executed queries along with corresponding results and zero-knowledge range proofs.

16. The system of claim 14, wherein the service provider device is further configured to store the received query along with the result of the query and the computed zero-knowledge range proof therefor in the key-value datastore.

17. The system of claim 16, wherein the data owner device is configured to update the said data, and wherein the service provider device is further configured to:
- determine one or more previously executed queries along with corresponding result and one or more zero-knowledge range proofs stored in the key-value datastore related to the updated data; and
- delete the determined one or more previously executed queries along with the corresponding one or more zero-knowledge range proofs from the key-value datastore, in case of updation of the said data.

18. A non-transitory computer readable medium containing executable program instructions for causing a computing system to perform a method for providing zero-knowledge range proofs for verifiable privacy-preserving queries, the computing system comprising a prover and a verifier each implementing proof systems, the method comprising:
- defining a bilinear group containing three prime-order groups $G_1$, $G_2$, $G_T$ and a bilinear map e defined by a pairing operation as: $G_1 \times G_2 \to G_T$, for each pair of elements $x_1$, $x_2$ belonging to $G_1$, $G_2$ respectively;
- receiving, by the prover, a query from the verifier;
- determining, by the prover, a range proof for a result of the query, implementing a variation of a bulletproof (BP) range proof system, over the bilinear group;
- generating, by the prover, a first inner product for the range proof, implementing the variation of the BP range proof system, for proving from two scalar vectors l, r of size n giving a proof for t is a scalar inner product defined as:

$$\hat{t} = \sum_{i=1}^{n} l_i r_i \in Z_p;$$

- generating, by the prover, a second inner product for the range proof, implementing a trusted inner pairing product (TIPP) proof system from two vectors A, B of size m that belong to $G_1$, $G_2$ respectively, using the bilinear map e, wherein the second inner product is defined as:

$$Z = e(A, B) = \prod_{i=1}^{n} e(A_i, B_i) \in G_T; \text{ and}$$

- providing, by the prover, elements as the proof to the verifier, including the element $\hat{t} \in Z_p$, $Z \in G_T$ to allow the verifier to check the relation: $Z = e(g, h)^t$, as g, h are public generators of groups $G_1$, $G_2$ respectively, wherein the prover provides the result of the query and the elements as proof of correctness while maintaining privacy.

19. The non-transitory computer readable medium of claim 18, wherein the system comprises:
- a data owner device providing data;
- a client device providing a query related to the said data; and
- a service provider device comprising a database configured to store the said data from the data owner device, wherein the service provider device is configured to:
  - receive the query from the client device,
  - compute the result of the query using the stored data in the database thereof and a zero-knowledge range proof for the received query, by executing the method, and
  - provide the computed zero-knowledge range proof to the client device.

20. The non-transitory computer readable medium of claim 18, wherein in the system, the service provider device is the prover, and the client device is the verifier, and wherein the client device is configured to utilize the provided verification key and the elements of the proof including Z and $\hat{t}$ values for verifying the computed zero-knowledge range proof provided thereto.

* * * * *